April 28, 1970 T. E. REDICK 3,508,803

TELEPHONE DIRECTORY MOUNTING

Filed July 18, 1968

4 Sheets-Sheet 1

INVENTOR
T.E. REDICK
BY [signature]
ATTORNEY

April 28, 1970 T. E. REDICK 3,508,803

TELEPHONE DIRECTORY MOUNTING

Filed July 18, 1968 4 Sheets-Sheet 2

3,508,803

TELEPHONE DIRECTORY MOUNTING

Thomas E. Redick, Indianapolis, Ind., assignor to Bell Telephone Laboratories, Incorporated, Murray Hill, N.J., a corporation of New York Filed July 18, 1968, Ser. No. 745,940
Int. Cl. A47b *63/00*
U.S. Cl. 312—233 9 Claims

ABSTRACT OF THE DISCLOSURE

A telephone directory is supported horizontally under a shelf by a pivotally mounted swing-out tray. A pulling force exerted on a handle that is integral with the tray pivots the tray outwardly from its normal position inside a box-like housing member. The binder is attached to the supporting tray by means of a hinge that is affixed to the spine of the binder so that when opened, one side of the directory is supported by the shelf and the other half by the tray.

BACKGROUND OF THE INVENTION

Field of the invention

This invention relates to telephone directory storage facilities and more particularly to directory mounting arrangements of the type employed at pay telephone stations.

Description of the prior art

Of all of the many problems associated with the operation of pay telephone stations, the seemingly least complex, the problem of telephone directory storage, appears to be the most persistent. The reason is evidently related to the fact that the diverse requirements for the proper storage of directories designed for public use are not wholly compatible, which leads to undesirable compromises among these requirements or the omission of one or more desirable features.

First in rank among the requirements noted is that the directory be readily and conveniently available to the user. Stimulating the habit of directory use at pay telephone stations is obviously an economic necessity since the advantages accruing from a reduction in the requirement for information operators can readily be calculated in terms of dollars saved. Another requirement is that the directory be protected from the adverse effects of exposure—particularly in outdoor installations where protection from rain, for example, is essential. A further requirement relates to the need for a strict limitation on the degree of physical stress placed on a directory not only by actual use but also by the nature of the storage arrangement. Still another requirement is that the directory facility be esthetically pleasing—at least to the extent that the directory storage arrangement does not detract from the general appearance of the telephone pay station as a whole. As in any other business, a generally neat, attractive and pleasing atmosphere at the point of sale is an important asset.

The broad object of the invention therefore is to meet the requirements indicated without any substantial increase in telephone directory storage costs.

SUMMARY OF THE INVENTION

The stated object and related objects are achieved in accordance with the principles of the invention by a telephone directory storage facility that affords horizontal storage support as opposed to more conventional methods which store the directory with the spine in a vertical plane. Whether the directory is suspended by a simple chain or supported in a rack, these vertical storage techniques offer little protection to the directory. The pages buckle readily, become mutilated easily, and soon loosen from the binding. The result is that directories must be replaced at an undesirable frequency.

To ensure adequate protection from weather, a directory facility in accordance with the invention is positioned underneath the usual convenience shelf. The book itself is supported on its side by a pivotally mounted swing-out tray which in turn is normally positioned within a box-like housing. The tray may be pivoted outwardly from under the shelf through a 90 degree arc. When fully pivoted, the tray is restrained from arbitrary movement by a detent, and the directory, still horizontal, is at a 90 degree angle with respect to the shelf. The binder of the directory is attached to the tray by means of a hinge positioned along the directory spine. Accordingly, as the book is opened, the entire binder is made to pivot on its rear hinge and the left (in relation to the user) portion of the book comes to rest on the shelf while the right portion thereof is still supported by the tray. Virtually no strain is placed on the directory binder by this action and consequently directory life is substantially increased as compared to conventional arrangements.

An important feature of the invention relates to the reinforced back or spine portion of the directory binding and to the piano-type hinge which has one side longitudinally affixed thereto. The other side of the hinge is affixed to a bracket member supported by the pivotal shelf. The hinge is preferably mounted near the center line of the binder spine. The resulting interaction of the forces involved ensures that after the binder has been opened and the upper cover is resting on the convenience shelf, only the slightest additional pressure is required to pivot the entire binder on the spine hinge. Consequently, the book becomes fully open and directory information printed even on the innermost edges of the exposed pages is made readily visible without further spreading pressure.

DESCRIPTION OF AN EMBODIMENT

Figure 1:
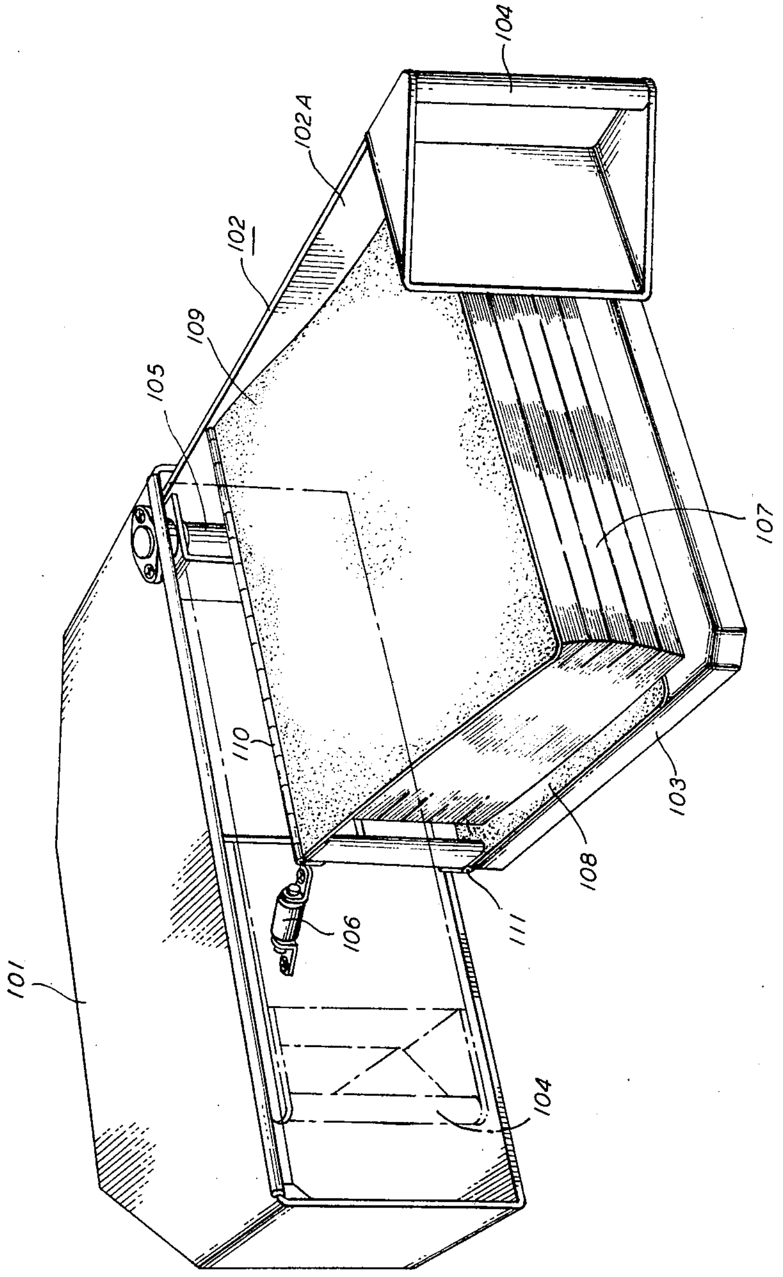
FIG. 1 is a sketch shown in perspective of a telephone directory mounting in accordance with the invention with the closed directory shown both in the stored and retrieved position.

As shown in FIG. 1, a telephone directory mounting in accordance with the invention includes two primary structural members; namely, a housing 101 and a tray 102 pivotally mounted for swing-out operation by pivot shaft 105. The tray 102 includes a shelf 103, a cover plate 102A and an integral handle 104.

When in the fully stored position, illustrated by the dotted lines, the cover 102A is flush with the edges of the open side of the housing 101. The tray 102 may be pivoted outwardly for use by simply pulling on the handle 104 until the directory 107 has been moved through an arc of approximately 90 degrees. The user obviously stands facing the lower portion of the directory 107 so that the housing 101 is on his left. To enhance the clarity and simplicity of the embodiment illustrated, a showing of a complete public telephone installation has been omitted. It should be understood, however, that the housing 101 is typically mounted on the underside of the conventional convenience shelf which extends outwardly and horizontally in relation to the vertical support panel of the telephone instrument.

Figure 3:
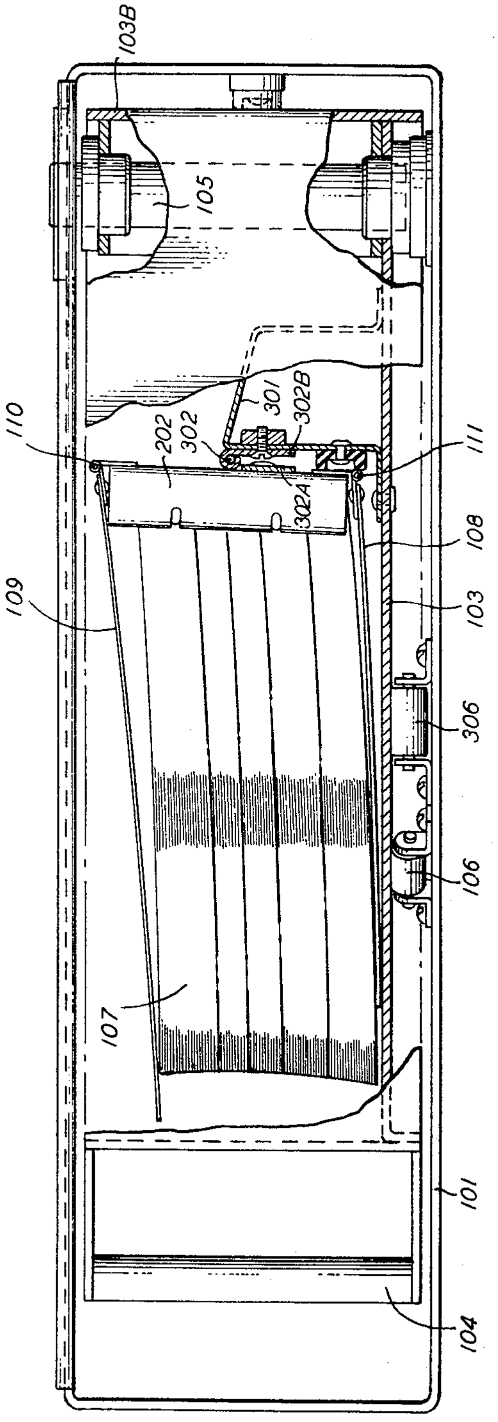
FIG. 3 is an end view of the directory mounting shown in FIG. 1, partially broken away and partially in cross section with the directory in the stored position.
Figure 4:
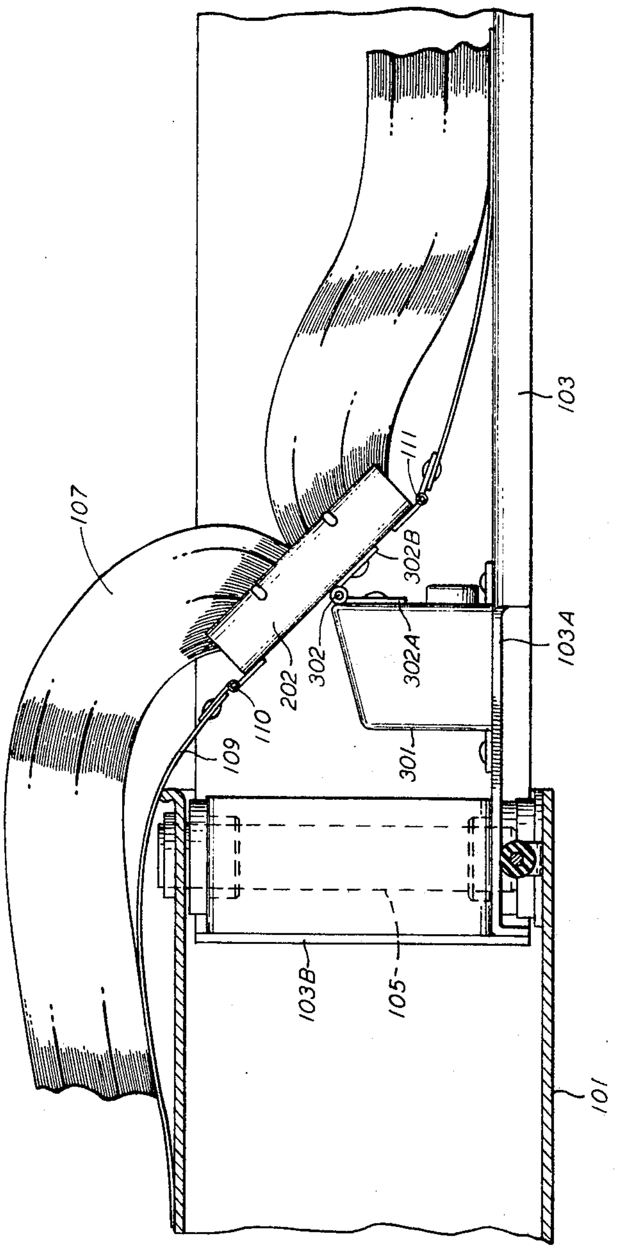
FIG. 4 is an end view of the directory mounting shown in FIG. 1 with the directory in the fully open position.

In the course of its swing through the arc as described above, the shelf 103 is supported by the rollers 106 and 306, as shown in FIG. 3. The rollers 106 and 306 are in turn mounted on the bottom portion of the housing 101.

As shown in FIG. 3, one side 302A of a piano-type hinge 302 is affixed to the back portion or spine 202 of the directory binder assembly, which further includes a top cover 109, a bottom cover 108 and hinges 110 and 111 which join the cover members 108 and 109 to the spine 202. The other half 302B of the hinge 302 is affixed as shown to a bracket 301 which is in turn supported by the shelf 103. For reasons described hereinbelow, the hinge 302 is mounted so that its longitudinal axis is affixed approximately at the horizontal center line of the binder spine 202.

Figure 2:
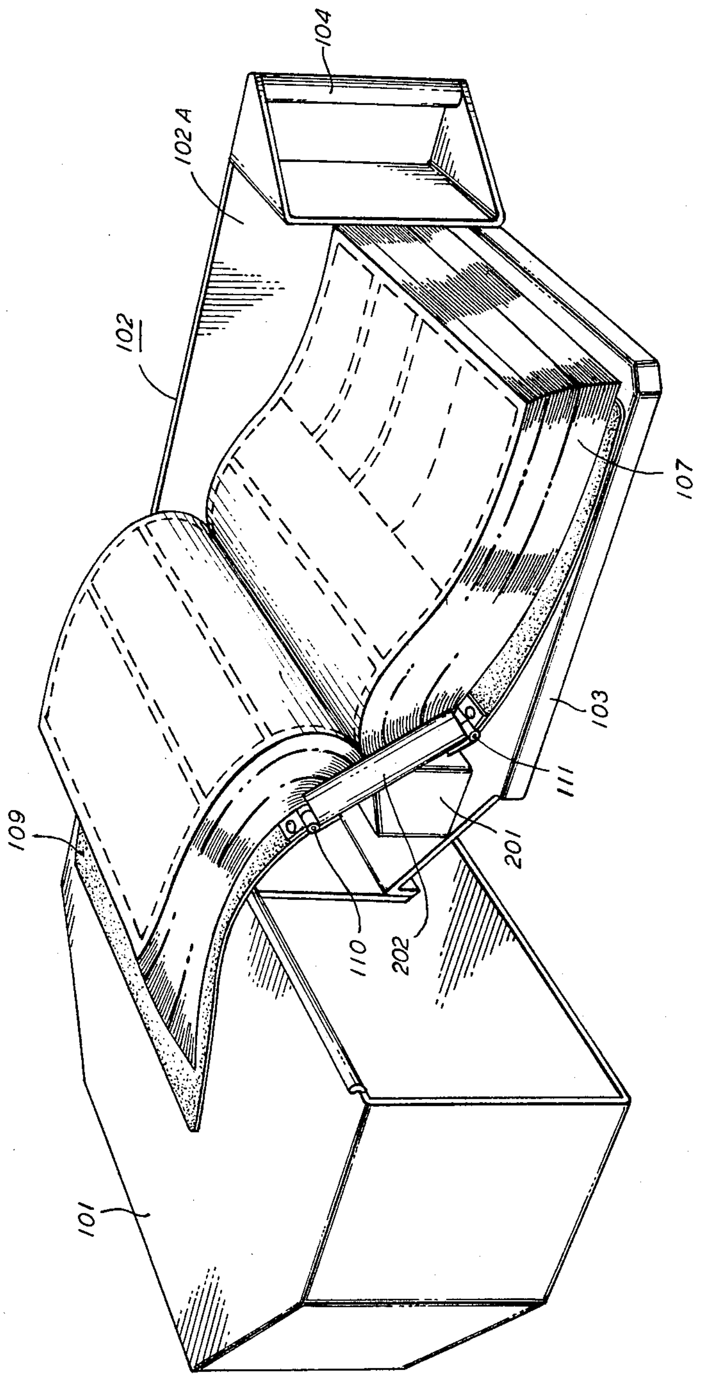
FIG. 2 is a sketch in perspective of the directory mounting shown in FIG. 1 with the directory in the open position.

Opening the binder to the position shown in FIG. 2 is achieved conventionally simply by grasping the top cover 109 together with the desired number of directory pages and swinging it upwardly and to the left so that the left-hand portion of the binder rests on top of the housing 101. As indicated above, in the usual installation the left portion of the binder would be resting on a convenience shelf positioned immediately above the housing 101. If the portion of the open directory page to be consulted is on the outer portion of the pages, generally no further action need be taken. If, however, the desired information is printed on the inside portion of one of the pages, this portion may readily and fully be exposed by a slight additional hand pressure on the left portion of the open binder. The mounting location of the hinge 302 ensures that this action may be taken with minimum effort, owing to the fact that the binder becomes increasingly biased to the open position as one progresses toward the back pages of the directory. This desirable feature offsets the natural tendency for the inner column listings to be increasingly more difficult to see as one approaches the end of the book.

Despite the forces described which tend to retain the binder in an open position, once opened, these forces are so nearly balanced that only a very slight restoring force on the left portion of the open directory need be exerted to return the directory to the closed position illustrated in FIG. 1.

After using the directory, the combination of the obstructing aspect of the directory tray 102 and the large inviting handle 104, tends to motivate the customer to swing the tray 102 back into its housing 101 as an almost automatic reflex action.

In accordance with the invention, the separate two restoring steps described above may be readily combined for additional convenience at the choice of the user. The application of a slight restoring force on the handle of the tray is effective in causing the opened pages to roll off the shelf. Thus, the invention provides for the automatic closing of the book as the tray is restored.

It should be noted that when the directory is not in use, a storage facility in accordance with the invention places no stress whatsoever on the directory binding and consequently, directory life is substantially enhanced. A further contribution toward the extension of directory life is of course achieved by virtue of the complete protection from exposure which the directory enjoys when in the fully stored position.

It is to be understood that the embodiment described herein is merely illustrative of the principles of the invention. Various modifications thereto may be effected by persons skilled in the art without departing from the spirit and scope of the invention.

What is claimed is:

1. Apparatus for mounting a telephone directory under a shelf comprising, in combination,
- a tray member for supporting said directory in a flat, horizontal position under said shelf,
- an open-sided, box-like housing for said tray including means pivotally supporting said tray thereby to permit said tray and directory to swing out horizontally from under said shelf,
- a directory binder assembly including cover members and a spine member,
- hinge means affixed to said spine substantially along the horizontal longitudinal center line thereof,
- said hinge means attaching said spine to said tray,
- whereby said binder and directory are permitted to pivot upwardly as said directory is opened,
- one side of said directory being supported by said shelf when said directory is in the open position, and
- whereby said directory may be automatically closed and said tray may be returned to a stored position in response to a restoring force on said tray.

2. Apparatus for mounting a telephone directory under a shelf comprising, in combination,
- a fixed box-like, open-sided housing,
- a tray member within said housing being mounted for pivotal horizontal movement outside of said housing,
- said tray member providing horizontal support for said directory,
- a directory binder assembly including a spine portion and covers hinge-mounted thereto,
- a raised bracket affixed to said tray member,
- a handle member integral with said tray member thereby to facilitate manual initiation of pivotal movement of said tray and directory,
- a hinge member having one side thereof affixed longitudinally along said spine, the center of said hinge positioned along the longitudinal horizontal center line of said spine,
- the other side of said hinge being affixed to said bracket,
- whereby upon the opening of said directory, said spine pivots on said hinge, one side of said directory, when in the open position, being supported by said shelf and the other side of said directory at the outermost edge thereof being supported by said tray.

3. Apparatus in accordance with claim 2 wherein said tray member includes a vertical cover portion that substantially covers the open side of said housing when said tray is in the housed position.

4. Apparatus in accordance with claim 3 wherein said cover portion terminates in said handle member.

5. Apparatus in accordance with claim 3 including a roller member mounted on the bottom portion of said housing thereby to ensure only rolling friction between said housing and said tray during the pivotal movement of said tray.

6. Apparatus for mounting a telephone directory comprising, in combination,
- an open-sided, box-like housing,
- a tray member for supporting said directory horizontally, tray mounting means for enabling pivotal, horizontal movement of said tray and directory into and out of said housing, a directory binding assembly including a spine member affixed to the binding portion of said directory, a raised bracket member mounted on said tray, a hinge having one side thereof affixed to said spine member and the other side thereof affixed to said bracket, the longitudinal axis of said hinge being along the longitudinal, horizontal center line of said spine member, thereby to provide a slight mechanical bias for retaining said directory in the open position, once opened, while still enabling directory closure with minimal manual force.

7. Apparatus in accordance with claim 6 wherein said tray member includes a vertical cover portion that substantially covers the open side of said housing when said tray is in the housed position.

8. Apparatus in accordance with claim 7 wherein said cover portion terminates in a rod-like handle member thereby to facilitate grasping said tray manually to effect pivotal movement thereof.

9. Apparatus in accordance with claim 7 including roller members affixed to the inside bottom portion of said housing, said roller members supporting said tray.

References Cited

UNITED STATES PATENTS

| | | | |
|---|---|---|---|
| 1,980,650 | 11/1934 | Webber | 248—447 |
| 2,264,419 | 12/1941 | Unger | 312—233 |
| 2,494,382 | 1/1950 | Faulkner | 312—233 |
| 2,528,318 | 10/1950 | Payne | 248—447 |
| 2,834,148 | 5/1958 | Walter | 248—447 |
| 2,937,470 | 5/1960 | Upton | 248—447 |
| 3,317,176 | 5/1967 | Herrin | 312—233 X |

NILE C. BYERS, Jr., Primary Examiner

U.S. Cl. X.R.

248—447